(12) United States Patent
    Friedman

(10) Patent No.: US 9,165,605 B1
(45) Date of Patent: Oct. 20, 2015

(54) SYSTEM AND METHOD FOR PERSONAL FLOATING VIDEO

(76) Inventor: Lindsay Friedman, Chagrin Falls, OH (US)

( * ) Notice: Subject to any disclaimer, the term of this patent is extended or adjusted under 35 U.S.C. 154(b) by 189 days.

(21) Appl. No.: 12/879,733

(22) Filed: Sep. 10, 2010

Related U.S. Application Data

(60) Provisional application No. 61/241,580, filed on Sep. 11, 2009, provisional application No. 61/330,637, filed on May 3, 2010.

(51) Int. Cl.
    *G11B 27/00* (2006.01)
    *G11B 27/34* (2006.01)

(52) U.S. Cl.
    CPC ...................................... *G11B 27/34* (2013.01)

(58) Field of Classification Search
    CPC ... H04N 5/772; G11B 27/034; G11B 2220/90
    USPC .......... 386/224, 278, 280, 286, 287; 382/173;
            345/619, 634, 418, 419, 473; 725/109,
            725/112; 348/207.1, 211.3, 239, 241, 586
    See application file for complete search history.

(56) References Cited

U.S. PATENT DOCUMENTS

| | | | |
|---|---|---|---|
| 5,764,306 A | 6/1998 | Steffano | |
| 5,914,748 A * | 6/1999 | Parulski et al. | 348/239 |
| 6,909,806 B2 | 6/2005 | Li | |
| 7,483,062 B2 | 1/2009 | Allman et al. | |
| 7,839,399 B2 * | 11/2010 | Benman | 345/418 |
| 8,294,823 B2 * | 10/2012 | Ciudad et al. | 348/586 |
| 2001/0014175 A1 * | 8/2001 | Tavor | 382/167 |
| 2003/0020974 A1 * | 1/2003 | Matsushima | 358/521 |
| 2005/0276446 A1 * | 12/2005 | Chen et al. | 382/103 |
| 2007/0065143 A1 * | 3/2007 | Didow et al. | 396/429 |
| 2007/0147514 A1 * | 6/2007 | Yamaguchi et al. | 375/240.24 |
| 2007/0150612 A1 | 6/2007 | Chaney et al. | |
| 2008/0077953 A1 | 3/2008 | Fernandez et al. | |
| 2009/0033737 A1 * | 2/2009 | Goose et al. | 348/14.07 |
| 2009/0167870 A1 * | 7/2009 | Caleca et al. | 348/207.1 |
| 2009/0295825 A1 * | 12/2009 | Takamatsu et al. | 345/600 |
| 2010/0027961 A1 * | 2/2010 | Gentile et al. | 386/52 |
| 2010/0234007 A1 * | 9/2010 | Shao | 455/418 |
| 2010/0287067 A1 * | 11/2010 | Abramowitz et al. | 705/27 |
| 2011/0008017 A1 * | 1/2011 | Gausereide | 386/280 |
| 2011/0043627 A1 * | 2/2011 | Werling et al. | 348/143 |
| 2011/0052002 A1 * | 3/2011 | Cobb et al. | 382/103 |
| 2011/0265136 A1 * | 10/2011 | Liwerant et al. | 725/112 |

OTHER PUBLICATIONS www.apple.com/macosx/what-is-macosx/photo-booth.html, Oct. 5, 2010.
www/livedocs.adobe.com/en us/Premier Pro/3.0/help.html?content=WSD741D3AF-138, Oct. 5, 2010.
www.rovion.com, Oct. 5, 2010.
www.livefaceonweb.com/default.aspx, Oct. 5, 2010.

* cited by examiner

*Primary Examiner* — Thai Tran
*Assistant Examiner* — Mishawn Dunn
(74) *Attorney, Agent, or Firm* — Fay Sharpe LLP

(57) ABSTRACT

Systems and methods for providing a user with a floating video of a subject are provided. The systems and methods generate a floating video by removing background pixels of a primary video using a background image/video, where the user records the primary video and the background image/video. The floating video may be generated on a recording device of the user and/or a remote server. Further, the user and/or the remote server may host the floating video.

3 Claims, 6 Drawing Sheets

SYSTEM AND METHOD FOR PERSONAL FLOATING VIDEO

CROSS-REFERENCE TO RELATED APPLICATIONS

This application claims priority from and benefit of the filing date of U.S. provisional application Ser. No. 61/241,580 filed Sep. 11, 2009, and claims priority from and benefit of the filing date of U.S. provisional application Ser. No. 61/330,637 filed May 3, 2010, and the entire disclosure of each of these provisional applications is hereby expressly incorporated by reference into the present specification.

BACKGROUND

The present exemplary embodiments relate generally to systems and methods for removing pixels. They find particular application in conjunction with producing universally formatted floating video that can be applied, with other components, to websites, web pages, social networking pages, emails and other social mediums. However, it is to be appreciated that the present exemplary embodiment is also amenable to other like applications.

A floating video is a video in which the background of the video is removed, thereby giving the foreground of the video the effect of floating. Generally, a subject of focus, such as an object or a person, demarcates between the background and the foreground of the video. Additionally, in certain instances, the floating video is overlaid on a new background. A common usage of floating video is in weather forecasts, wherein meteorologists present the weather in front of a weather map.

Traditional solutions for generating a floating video rely upon chroma key compositing in which a color (or a small color range) is removed from a video. However, these solutions depend upon a studio to professionally shoot the video in front of a "green screen" or a "blue screen" and to edit the video to remove the background. Naturally, such solutions tend to prove costly, whereby they're not readily available to the common person.

In view of the deficiencies noted above, there exists a need for improved systems and/or methods for bringing floating video to the masses. The present application contemplates such new and improved systems and/or methods which may be employed to mitigate the above-referenced problems and others.

BRIEF DESCRIPTION

In accordance with one aspect of the present application, a method is illustrated for providing a user with a floating video of a subject. The method receives a background image and/or video of a static single colored background from the user over a communications network. Similarly, the method receives a primary video of the subject from the user over the communications network, where the subject is disposed in front of the static background. A processor removes the background of the primary video to define a subject video, where the background is removed using the background image and/or video, and the subject video is stored.

In accordance with another aspect of the present application, a method is illustrated for providing a user with a floating video of a subject. The method receives a webcam image of a user placed in front of static single colored background over a communications network. The user then selects the single color range that the method should remove. A processor removes the selected color in real time. The user can then watch and record their video with the selected background masked out of the video.

In accordance with another aspect of the present application, a method is illustrated for providing a user with a floating video of a subject. The method records a background image and/or video of a static background. Similarly, the method records a primary video of the subject, wherein the subject is disposed in front of the static single colored background. A processor removes the background of the primary video to define a subject video, wherein the background is removed using the background image and/or video, and the subject video is stored.

In accordance with another aspect of the present application, a system is provided for providing a user with a floating video of a subject. The system includes an imaging device, a processor and a storage medium. The digital video recorder records a background image and/or video of a static background. Further the imaging device records a primary video of the subject, wherein the subject is disposed in front of the static background. The processor removes the background of the primary video to define a subject video, wherein the background is removed using the background image and/or video, and the subject video is stored on the storage medium.

DETAILED DESCRIPTION

The systems and methods, discussed in detailed hereafter, pertain to systems and methods for producing universally formatted floating video. Namely, said systems and methods strip a fixed single colored background from a video, thereby leaving a floating subject, such as an object or a person, that can be floated on top of any webpage, profile page, eCard, emails, and the like.

Figure 1:
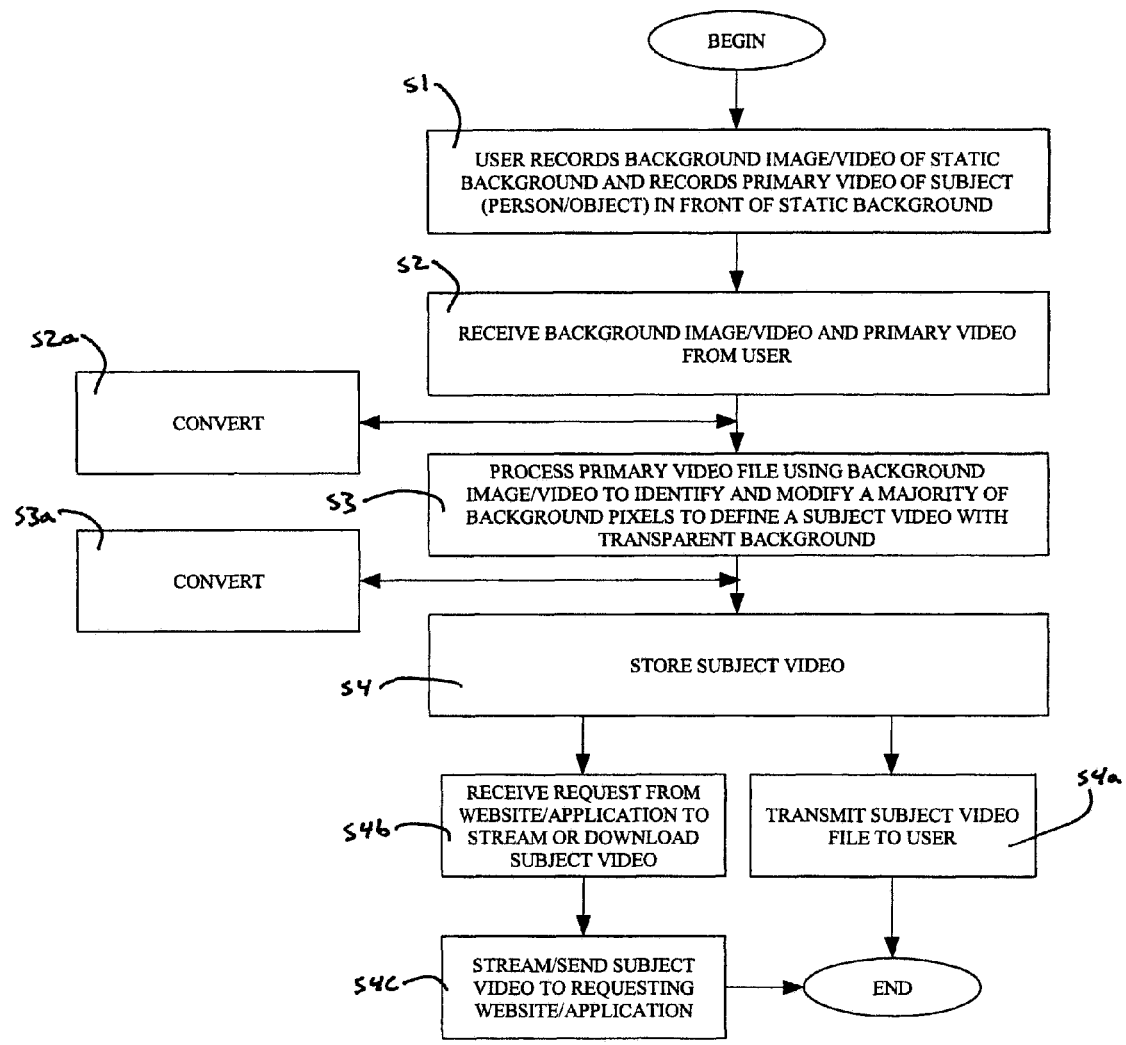
FIG. 1 illustrates a method for providing a user with a floating video and/or hosting the floating video for the user.

With reference to FIG. 1, a method for providing a user with a floating video and/or hosting the floating video for the user is illustrated. In a step S1, using any suitable digital video recorder, a user records (captures) a background digital image (one frame of pixels) or video (at least two frames of pixels) of any desired static single colored background such as a wall, a sheet or the like. Also in step S1, the user records a primary digital video of a person or object or other subject in front of the static background. The digital video recorder can be a cellular phone digital video recorder such as an Apple iPhone or other cell phone video camera, a Flip or other brand digital video recorder or the like. Unlike known "green screen" or "blue screen" methods, the static background need not be any particular color and need not be smooth and homogenous, it does however, need to be single colored. Instead, the static background can be any wall or any other desired static location, but it is preferred that a static (non-moving) background color be selected that will contrast with the subject to facilitate subsequent image processing as described herein. The background image/video and primary video are typically captured and stored as successive frames of a single video file but they could be discrete files that are captured and stored separately. Under the former, the first few seconds, for example, can be stripped from the single video file to define the background image/video.

In a step S2, an administrator receives the background image/video and the primary video, collectively referred to herein as "input data," from the user. Preferably, the administrator receives the input data via a communications network, such as the Internet. In an optional step S2a, the input data is converted to a desired video format for further processing.

In a step S3, in exchange for a fee paid by the uploading user or by an advertiser or by a third party website, technology sites, or companies that have licensed the technology, the administrator processes the primary video file received in step S2 to identify and modify at least a majority of background pixels (i.e., pixels that represent the static background but not the subject) in all or at least a select group of the frames of the primary video data file. Backgrounds pixels are identified as those pixels having color values within a subset of color values within the background image/video. Hence, backgrounds pixels are identified using the background image/video under the assumption that the background image/video includes all, or substantially all, the varying background color values created by different lighting circumstances. To adjust between performance and quality, the user may select how granular pixel comparisons are. In this "background removal" operation, the identified background pixels are then "removed" in the sense that they are modified so as to be defined as being completely or partially "clear" or "transparent" in terms of color and transparency/opacity or are otherwise modified to have a desired color and/or transparency/opacity. For example, the alpha value for each background pixel may be set to zero. In an alternative "background removal" operation, the non-background (subject) pixels that define the subject (the inverse of the static background) are identified and extracted for input to a new video file that has a transparent background or other background of desired color and transparency/opacity. In either case, a "subject video" file (also referred to as a "floating video") is derived from the background removal operation, wherein the subject video comprises a plurality of frames of pixels that represent the subject ("subject pixels") set against a new background that is completely clear or transparent or that has another desired color and transparency/opacity. As used herein, a pixel is deemed to be fully or partially "transparent" if it does not fully obscure or replace underlying pixel data on a video monitor when it is rendered to the same location on the video monitor so that it allows the underlying pixel data to be perceived by a user. A completely clear or transparent background pixel will not affect the underlying pixel data and/or the manner in which it is perceived by a viewer of the video monitor, while a partially transparent background pixel will diffuse or partially obscure the underlying pixel data as it is perceived by a viewer of the video monitor. The background removal operation could also comprise deleting the identified background pixels such that the subject video (floating video) is defined only by the remaining subject pixels (and any residual background pixels not identified and deleted).

In an optional step Sia, the subject video or floating video with its transparent or otherwise modified background is converted to a desired format such as Flash or html5.

In a step S4, the administrator stores the subject video file.

In one embodiment, a step S4a is performed in which the administrator transmits the subject video file to the user for the user's own use as desired, e.g., by a line of html produced by the method instantly, by e-mail or by selected file format.

In another embodiment, a user can download an advanced H-264 desktop version of the application on to their pc. With this method the video is recorded, processed and stored on the users pc. This application is for use in professional fields where conversion from a desktop video to an online video is required for distribution over the internet.

In another embodiment, a step S4b is additionally or alternatively performed in which the administrator receives a request from an application or website to stream or download or otherwise transmit the subject video file for playback by the website or application. This can be a request from a website such as a MySpace page or a media player or an application such as a Facebook application or a request from a personal website, or other process or application. A step S4c is performed in which the administrator streams or downloads or otherwise transmits the subject video to the requesting application or webpage over the internet or other network. In one example, the administrator provides the user that created the input data with an address and other required information for requesting playback of the subject video, which is stored by the administrator, and the step S4b comprises receiving a request that uses the subject video address.

The step S4c is performed according to user selected playback options, if any. In the illustrated embodiment, as part of the step S2, the administrator receives user input for desired playback options, and some or all of the user-requested options can be pay-options in which the user must pay the administrator to implement the options. In one example, a user can choose to implement cookies or other tags that track streaming or other transmission of the subject video. In such case, the user can choose to implement a cookie that enables one of a plurality of different stored subject videos to be transmitted in step S4c, depending whether the request received in step S4b is a new request or a repeat request. In the case where a website initiates a request for streaming playback of the subject video in response to a user visiting the website, this could prevent a user being subjected to a second performance of the same subject video. Other options available to a user in step S2 include the ability to control the placement and size of the subject video during streaming/playback, the ability to embed links and/or advertising in the subject video file, and the ability to control the extent to which the background pixels are modified in the input data.

The above-described process enables a system in which users create the input data and pay the administrator to derive the subject video data from the input data file. The user also pays to enable cookies and other streaming playback options such as controlling size and placement of the floating video during its stream/playback. In one example, the user pays the administrator for each stream or other transmission of the floating video from the administrator to a requesting website or application.

Figure 2:
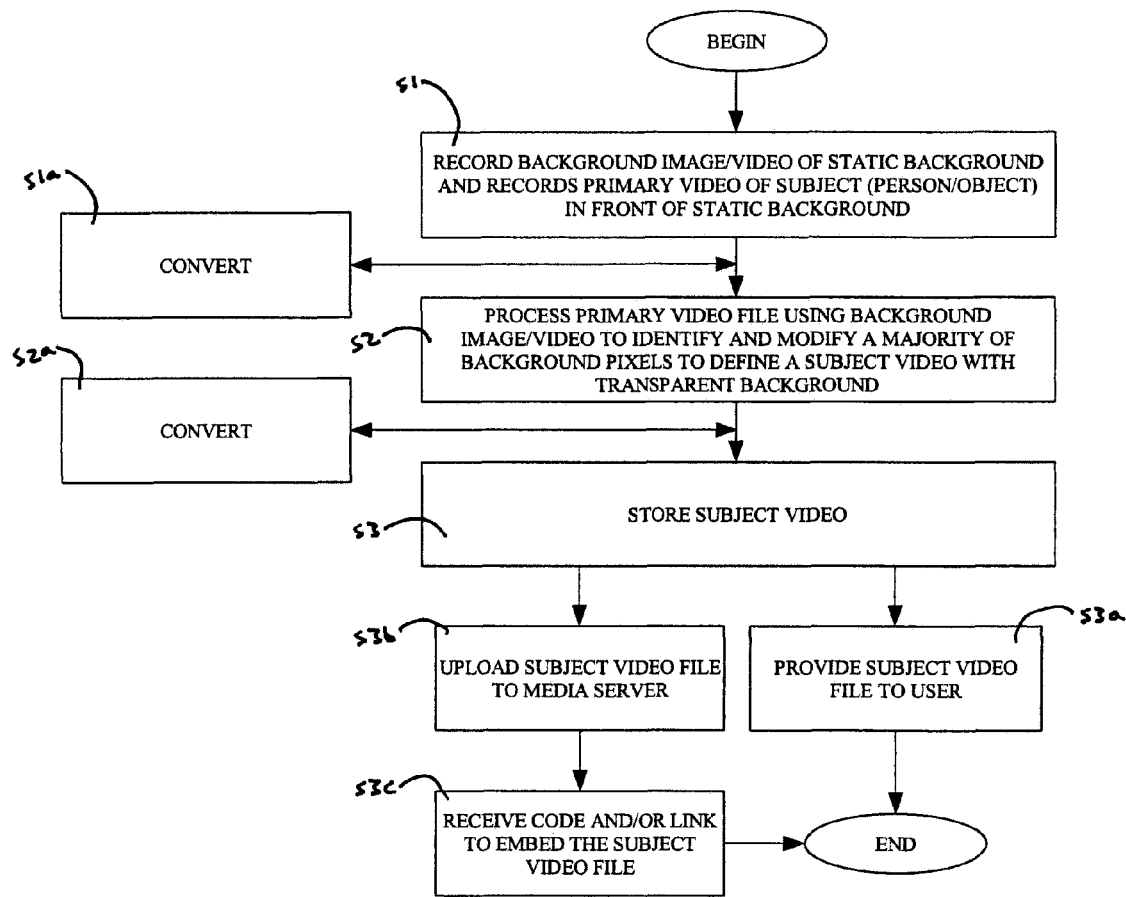
FIG. 2 illustrates a method for providing a user with a floating video and/or hosting the floating video for the user.

With reference to FIG. 2, a method for providing a user with a floating video is illustrated. In a step S1, using any suitable digital video recorder, a user records (captures) a background digital image (one frame of pixels) or video (at least two frames of pixels) of any desired static background such as a wall, a sheet or the like. Also in step S1, the user records a primary digital video of a person or object or other subject in front of the static background. The digital video recorder can be a cellular phone digital video recorder such as an Apple iPhone or other cell phone video camera, a Flip or other brand digital video recorder, a PC camera such as a webcam or the like. Unlike known "green screen" or "blue screen" methods, the static background need not be any particular color and need not be smooth and homogenous. Instead, the static background can be any single colored wall or any other desired single colored static location, but it is preferred that a static (non-moving) background be selected that will contrast with the subject to facilitate subsequent image processing as described herein. The background image/video and primary video are typically captured and stored as successive frames of a single video file but they could be discrete files that are captured and stored separately. Under the former, the first few seconds, for example, can be stripped from the single video file to define the background image/video. In one example of the present development, a background is deemed to be "single colored" if its color and luminance are substantially uniform such that a human observer would deem the background to be a single color.

In an optional step S1a, the background image/video and/or the primary video are converted to a desired video format for further processing.

In a step S2, the user processes the primary video file recorded in step S1 to identify and modify at least a majority of background pixels (i.e., pixels that represent the static background but not the subject) in all or at least a select group of the frames of the primary video data file. Backgrounds pixels are identified as those pixels having color values within a subset of color values within the background image/video. Hence, backgrounds pixels are identified using the background image/video under the assumption that the background image/video includes all, or substantially all, the varying background color values created by different lighting circumstances. To adjust between performance and quality, the user may select how granular pixel comparisons are. In this "background removal" operation, the identified background pixels are then "removed" in the sense that they are modified so as to be defined as being completely or partially "clear" or "transparent" in terms of color and transparency/opacity or are otherwise modified to have a desired color and/or transparency/opacity. For example, the alpha value for each background pixel may be set to zero. In an alternative "background removal" operation, the non-background (subject) pixels that define the subject (the inverse of the static background) are identified and extracted for input to a new video file that has a transparent background or other background of desired color and transparency/opacity. In either case, a "subject video" file (also referred to as a "floating video") is derived from the background removal operation, wherein the subject video comprises a plurality of frames of pixels that represent the subject ("subject pixels") set against a new background that is completely clear or transparent or that has another desired color and transparency/opacity. As used herein, a pixel is deemed to be fully or partially "transparent" if it does not fully obscure or replace underlying pixel data on a video monitor when it is rendered to the same location on the video monitor so that it allows the underlying pixel data to be perceived by a user. A completely clear or transparent background pixel will not affect the underlying pixel data and/or the manner in which it is perceived by a viewer of the video monitor, while a partially transparent background pixel will diffuse or partially obscure the underlying pixel data as it is perceived by a viewer of the video monitor. The background removal operation could also comprise deleting the identified background pixels such that the subject video (floating video) is defined only by the remaining subject pixels (and any residual background pixels not identified and deleted).

In an optional step S2a, the subject video or floating video with its transparent or otherwise modified background is converted to a desired format such as Flash or html5.

In a step S3, the user stores the subject video file.

In one embodiment, a step S3a is performed in which the user is provided with the subject video for the user's own use as desired. For example, the user may be provided with a local file path to the subject video.

In another embodiment, in exchange for a fee paid by the user or by an advertiser or by a third party website, technology sites, or companies that have licensed the technology, a step S3b is additionally or alternatively performed in which the user uploads the subject video or floating video with its transparent or otherwise modified background to a media server of an administrator for hosting. The media server may, for example, be a Flash Media Server. As part of step S3b, the user may also specify playback options, where some or all of the user-requested options can be pay-options in which the user must pay an administrator of the media server to implement the options. In one example, the user can choose to implement cookies or other tags that track streaming or other transmission of the subject video. Other options available to the user include the ability to control the placement and size of the subject video during streaming/playback, the ability to embed links and/or advertising in the subject video file, and the ability to add a watermark to the subject video.

Thereafter, a step S3c is performed in which the user receives a code snippet and/or link to embed the uploaded subject video file in a webpage, profile page, eCard, emails, and the like. For example, the user could receive an html code snippet. The code snippet and/or link allows an application or website to stream or download or otherwise request the subject video file from the media server for playback by the website or application. The code snippet and/or link can be embedded within a website such as a MySpace page or a media player or an application such as a Facebook application or a request from a personal website, or other process or application.

The above-described process enables a system in which users create the subject video or floating video to pay the administrator to host the subject video. Users may also pay to enable cookies and other streaming playback options such as controlling size and placement of the floating video during its stream/playback. In one example, the user pays the administrator for each stream or other transmission of the floating video from the administrator to a requesting website or application.

In another embodiment, a user can download an advanced H-264 desktop version of the application on to their pc. With this method the video is recorded, processed and stored on the users pc. This application is for use in professional fields where conversion from a desktop video to an online video is required for distribution over the internet.

In view of the discussion heretofore, it should be appreciated the method of FIG. 1 concerns a server based method of generating the subject video and the method of FIG. 2 concerns a user based method of generating the subject video. In other words, the method of FIG. 2 generally takes place on a user device, such as a mobile phone, and the method of FIG. 1 generally takes place on a server remote from the user device. Further, although not illustrated, in situations where the user device lacks sufficient resources to generate the subject video in a timely manner, the method of FIG. 2 can be augmented with the method of FIG. 1 to timely generate the subject video. Namely, the background image/video and the primary video recorded on the user device can be passed to a remote server for processing should it be determined that the user device lacks sufficient resources to generate the subject video. Thereafter, the subject video can be returned to the user device for continuation along the method of FIG. 2 or left on the remote server for continuation along the method of FIG. 1.

Figure 3:
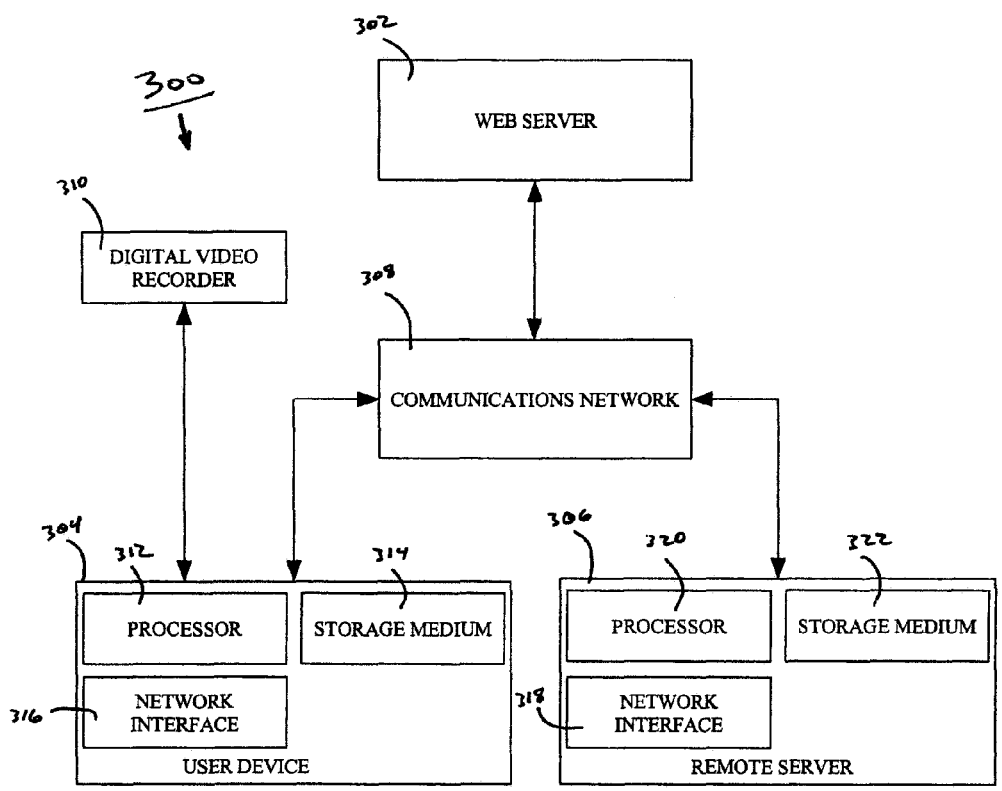
FIG. 3 illustrates a system employing the method of FIG. 1 and/or the method of FIG. 2.

With reference to FIG. 3, a system 300 employing the method of FIG. 1 and/or the method of FIG. 2 is illustrated. The system includes a web server 302, a user device 304 and a remote server 306 all interconnected by a communications network 308. The communications network 308 is, for example, the Internet and/or a local area network, and the web server 302 is a traditional web server running Apache, IIS or the like. In certain embodiments, the web server 302 may alternatively or additionally be an application server. The system further includes a digital video recorder 310, where the digital video recorder can be a cellular phone digital video recorder such as an Apple iPhone or other cell phone video camera, a Flip or other brand digital video recorder or the like. As shown, the user device 304 and the digital video recorder 310 are operatively connected such that recordings from the digital video recorder 310 can be transferred to the user device 304. This may be by way of USB, firewire, Bluetooth, wifi, etc. However, in alternative embodiments, the user device 304 and the digital video recorder 310 may be one and the same.

The user device 304 and remote server 306 include a processor 306, a network interface 308 and a storage medium 310. Suitably, the processor 306 is a microprocessor, microcontroller, graphic processing unit (GPU), etc. and the storage medium 310 is a magnetic disk or other magnetic storage medium, an optical disk or other optical storage medium, a random access memory (RAM) or other electronic memory device or chip or set of operatively interconnected chips, a network server from which data may be retrieved via the Internet or a local area network, or so forth. Further, the network interface 308 communicates with other devices connected to the communications network 308, such as the remote server 308/user device 304 and the web server 302. Although only a single user device 304 and/or a single remote server 306 are shown, it is to be appreciated that the user device and/or the remote server may be distributed across a plurality of devices and/or a plurality of servers.

In certain embodiments, the user device 304, in conjunction with the digital video recorder 310, carries out the method of FIG. 2. Namely, a user of the user device 304 records a background image and/or video of a static background using the digital video recorder 310. Likewise, the user records a primary video of a subject, wherein the subject is disposed in front of the static background. Thereafter, the user device 304 uses a processor 312 to remove the background of the primary video to define a subject video. The subject video is then stored on a storage medium 314 and optionally sent to the remote server 306 for hosting over the communications network 308 via the network interface 316. Assuming the subject video is sent to the remote server 306, the user device 304 receives, from the remote server 306, code and/or a link to embed the subject video in their website suitably hosted by the web server 302.

In other embodiments, the remote server 306, in conjunction with the digital video recorder 310 and the user device 304, carries out the method of FIG. 1. Namely, a user of the user device 304 records a background image and/or video of a static background using the digital video recorder 310. Likewise, the user records a primary video of the subject, wherein a subject is disposed in front of the static background. Thereafter, the user device 304 transfers the background image and/or video and the primary video, collectively referred to herein as "input data," to the remote server 306 over the communications network 308 via the network interface 316. The remote server 306 receives the input data via a network interface 318 and uses a processor 320 to remove the background of the primary video to define a subject video. The subject video is then stored on a storage medium 322 and optionally sent to the user device 304 via the communications network 308. Additionally, or in the alternative, the subject video is hosted for the user of the user device 304 so as to stream the subject video to requesting websites such as a website hosted by the web server 302.

In other embodiments, the user device 304 and remote server 306 coordinate with each other to carry out a hybrid of the method of FIG. 2 and the method of FIG. 1. Namely, in situations where the user device 304 has sufficient resources to generate the subject video, the user device 304 carries out the method of FIG. 2. However, in situations where the user device lacks sufficient resources to generate the subject video, the background image/video and the primary video recorded on the user device 304 are passed to the remote server 306 for processing in accordance with the method of FIG. 1.

Figure 4:
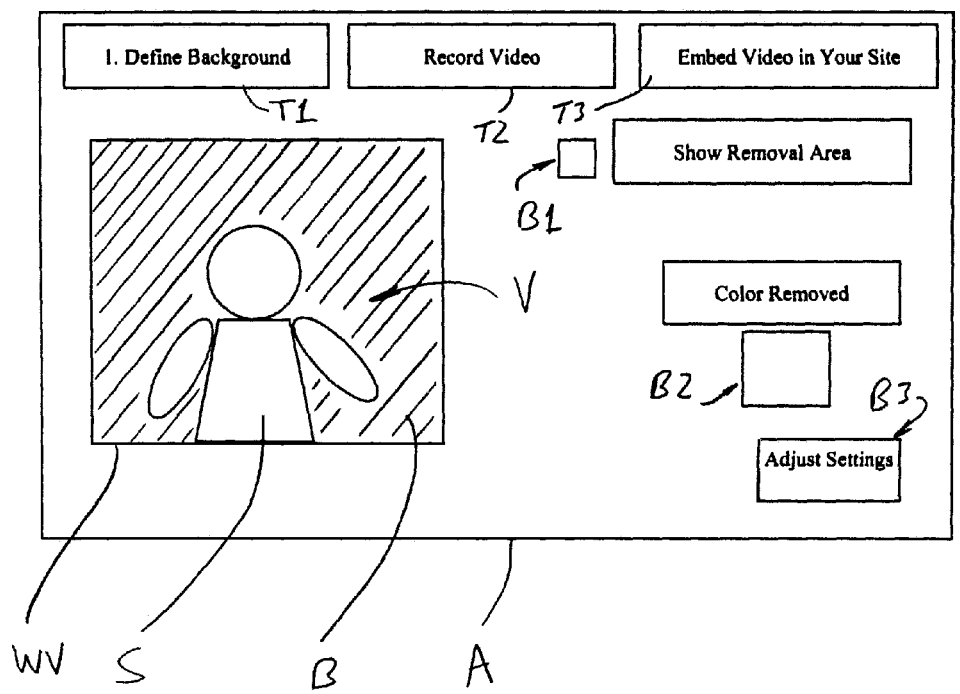
FIGS. 4, 5 and 6 use computer screen shots to illustrate a personal floating video processing method in accordance with one embodiment of the present development.

In accordance with one embodiment, the method includes processing (either locally or on a remote server) a webcam video stream of a user placed in front of static single colored background. The webcam video stream is processed in real-time by a local or remote application A in accordance with the development described herein, and the result is displayed to the user as a webcam video stream in real-time on the user's computer. As shown in FIG. 4, a user selects box T1 to initiate a "Define Background" step in which the user uses his/her own computer and webcam to display video V of a subject S in front of a background B of a certain color (the color is indicated by the particular cross-hatching). The webcam video V is continuously displayed to the user in real-time as shown in a window WV.

Figure 5:
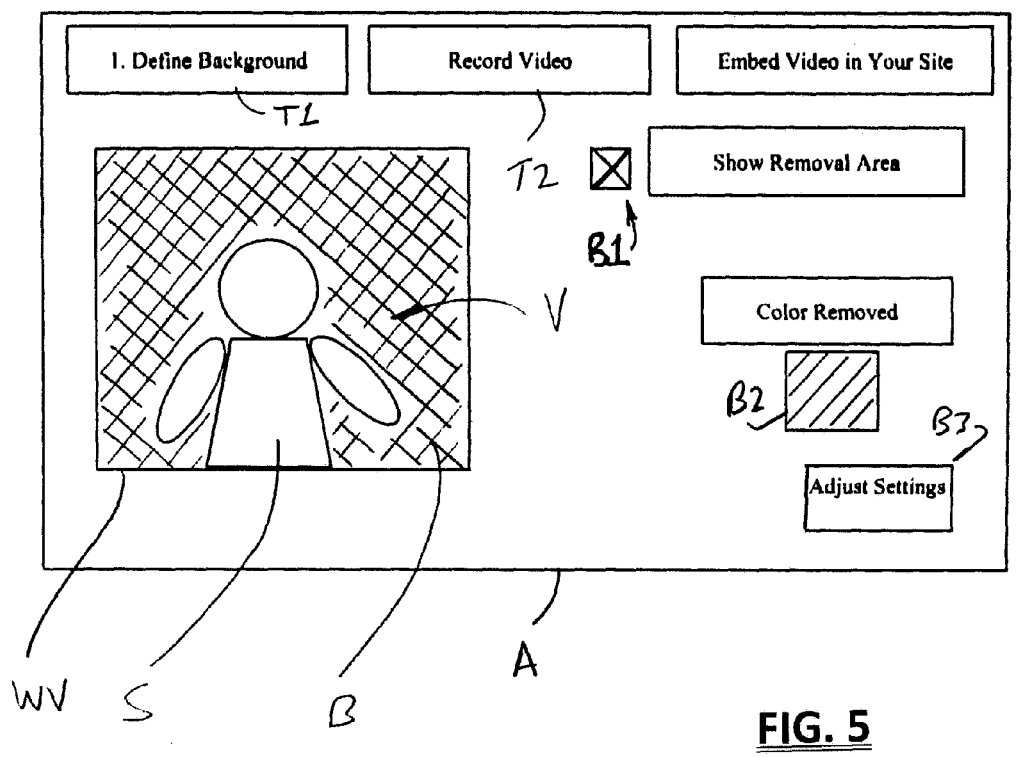

Referring also to FIG. 5, as the webcam video V is displayed in real-time, the user can select the box B1 "Show Removal Area" which causes the application to use a color or other indicia to "flag" or indicate in the window WV which regions of the video V will be removed based upon the color of that region. For example, a bright color, shading, or other indicia (indicated by bi-directional cross-hatching in FIG. 5) is then added to the video V to flag or show all regions thereof that will be removed (while the video continues to stream). The user then selects any object in the video of a certain color (e.g., the background B), and the video is processed in real-time to show which parts will be removed (by coloring the parts to be removed a certain color or by otherwise or otherwise flagging or changing the appearance of the parts to be removed). The color being removed from the video is displayed in the box B2 and is labeled "Color Removed" and the "Color Removed" box B2 is updated as the user selects a different colored object in the video V. FIG. 5 shows that the user has selected the box B1 and has also selected the background B as the color to be removed, which has caused the application to "flag" or change the color of the background B in the video V to a conspicuous color (bright pink or bright green, etc.—indicated in FIG. 5 by the bidirectional cross-hatching of the background B) to indicate that the background B will be removed when the webcam video stream is ultimately processed according to the present development. The video V including the flagging is sometimes referred to herein as the altered video.

If the user is satisfied with the areas to be removed from the video V as he/she is viewing the video in real-time (e.g., as shown in FIG. 5), the user can move to the next step of recording the video by selecting box T2.

Figure 6:
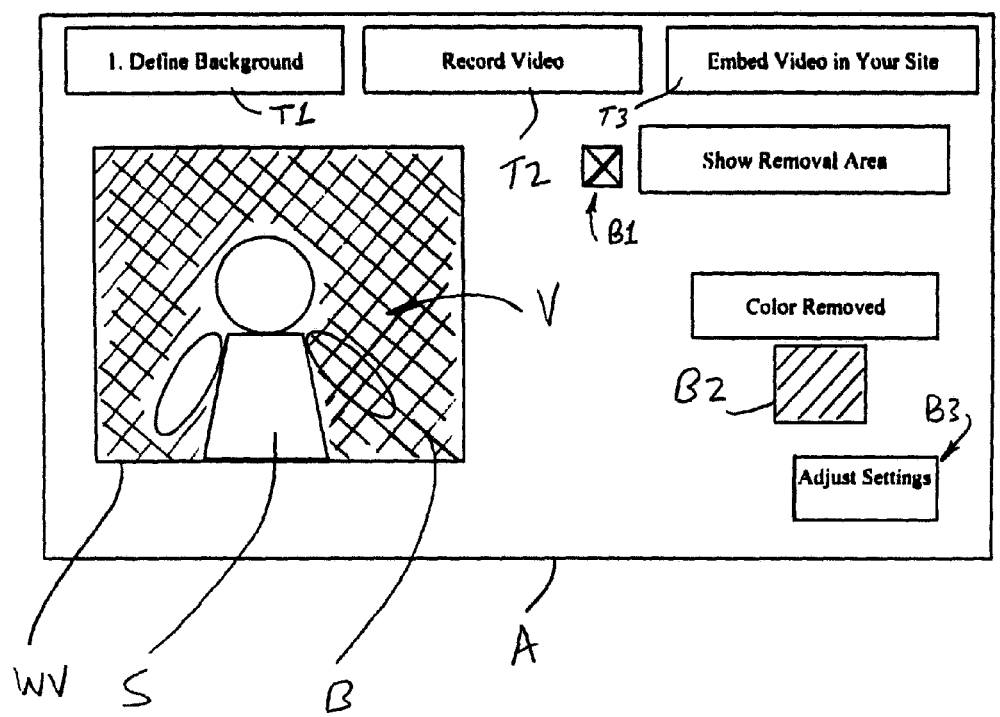

FIG. 6 shows an example that is similar to FIG. 5, but where the user will not be satisfied. In this case, the user's left arm has been flagged for removal from the video V due to the fact that the color of his/her left arm has been deemed to be similar to the background B by the application A. In such case, the user can change his/her appearance (e.g., change his/her shirt), change the lighting, change the background color, etc. Alternatively/additionally, the user can change the color removal processing settings by selecting the box B3 "Adjust Settings" so that the user is presented with multiple image processing parameters that can be adjusted by slider bars or the like (e.g., color sensitivity) until the user is satisfied with the resulting video V and the user then selects box T2 to begin the recording process.

When the user selects the "Record Video" box T2, the user is presented with "RECORD" "STOP RECORD" "PREVIEW" boxes (not shown) so that the user can record the video V (in one or more stages) while simultaneously viewing same in the window WV, preview the result, and re-record if desired. During recording and any preview playback, the areas to be removed are flagged with color or otherwise flagged as noted above so that the user can see in real time (or during preview playback) which parts of the video V will be/are being removed.

After recording is complete, the user selects the box T3 to embed the video in his/her website. The user is presented with a code snippet as described above to accomplish the video embedding. The user is also presented with a chance to preview the video in a test webpage.

In view of the discussion heretofore, in some embodiments, the exemplary methods, the systems employing the same, and so forth, of the present invention are embodied by a storage medium storing instructions executable (for example, by a digital processor) to implement the determination of image anchor templates. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Further, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for providing a user with a floating video of a subject, said method comprising:
    receiving a primary video of the subject wherein the subject is located in front of a single color static background, wherein said static background has a color not known prior to said primary video being received, and wherein said single color of said static background is not limited to any predetermined color;
    receiving background color removal input from a user that indicates a color of the static background, said background color input provided by an area of the background pixels within the primary video selected by the user or by an area of a color chart selected by the user, wherein said step of receiving background color removal input from the user comprises displaying said primary video to the user in real-time and, while the real-time video is being displayed to the user: (i) receiving input from the user that indicates a background color of the real-time video to be removed; and, (ii) altering the real-time video being displayed to the user to indicate said background color of the real-time video to be removed based on the user input and displaying the altered real-time video to the user so that the user can assess the background color to be removed;
    based upon said input received from the user that indicates the background color to be removed, removing the indicated background color identified by the user from the primary video to define a subject video in which the static single color background is not visible, wherein the background color is removed from the primary video by identifying pixels within the primary video having said indicated background color to be removed and setting the identified backgrounds pixels to transparent;
    transmitting the subject video to the user.

2. The method of claim 1, wherein said step of transmitting the subject video to the user comprises transmitting the subject video to an application or website of the user over a communications network.

3. The video processing method as set forth in claim 1, further comprising recording the altered video is displayed in real-time to the user.

* * * * *